(12) United States Patent
Buchmann et al.

(10) Patent No.: US 11,384,436 B2
(45) Date of Patent: Jul. 12, 2022

(54) PISTON RING WITH SHOT-PEENED RUNNING-IN LAYER AND METHOD FOR THE PRODUCTION THEREOF

(71) Applicant: FEDERAL-MOGUL FRIEDBERG GMBH, Friedberg (DE)

(72) Inventors: Michael Buchmann, Munich (DE); Markus Aumiller, Friedberg (DE)

(73) Assignee: Federal-Mogul Friedberg GmbH, Friedberg (DE)

( * ) Notice: Subject to any disclaimer, the term of this patent is extended or adjusted under 35 U.S.C. 154(b) by 180 days.

(21) Appl. No.: 16/632,672

(22) PCT Filed: Apr. 24, 2018

(86) PCT No.: PCT/EP2018/060449
§ 371 (c)(1),
(2) Date: Jan. 21, 2020

(87) PCT Pub. No.: WO2019/015818
PCT Pub. Date: Jan. 24, 2019

(65) Prior Publication Data
US 2020/0224317 A1 Jul. 16, 2020

(30) Foreign Application Priority Data

Jul. 21, 2017 (DE) .................... 10 2017 116 480.4

(51) Int. Cl.
*C23C 28/00* (2006.01)
*F16J 9/26* (2006.01)
(Continued)

(52) U.S. Cl.
CPC .............. *C23C 28/321* (2013.01); *C23C 4/08* (2013.01); *C23C 4/10* (2013.01); *C23C 4/129* (2016.01);
(Continued)

(58) Field of Classification Search
CPC ......... F16J 9/12; F16J 9/20; F16J 9/26; C23C 28/321; C23C 28/324; C23C 28/341;
(Continued)

(56) References Cited

U.S. PATENT DOCUMENTS

| 6,503,642 B1 | 1/2003 | Linde |
| 2005/0235944 A1* | 10/2005 | Michioka .............. C23C 28/021 |
| | | 123/193.2 |

(Continued)

FOREIGN PATENT DOCUMENTS

| DE | 69502181 T2 | 9/1998 |
| DE | 69700387 T2 | 1/2000 |

(Continued)

OTHER PUBLICATIONS

International Search Report, dated Jun. 7, 2018 (PCT/EP2018/060449).

*Primary Examiner* — Gilbert Y Lee
(74) *Attorney, Agent, or Firm* — Robert L. Stearns; Dickinson Wright, PLLC

(57) ABSTRACT

A piston ring includes an annular body, a wear-resistant layer that is applied to the annular body by thermal spraying, and a strain-hardened run-in layer, made of an AlCuFe alloy, that is applied to the wear-resistant layer by thermal spraying.

15 Claims, 4 Drawing Sheets

(51) Int. Cl.
    *C23C 4/129*     (2016.01)
    *C23C 4/131*     (2016.01)
    *C23C 4/134*     (2016.01)
    *C23C 4/08*     (2016.01)
    *C23C 4/10*     (2016.01)
    *C23C 4/18*     (2006.01)
    *F16J 9/12*     (2006.01)
    *F16J 9/20*     (2006.01)

(52) U.S. Cl.
    CPC .............. *C23C 4/131* (2016.01); *C23C 4/134* (2016.01); *C23C 4/18* (2013.01); *C23C 28/324* (2013.01); *C23C 28/341* (2013.01); *C23C 28/343* (2013.01); *F16J 9/12* (2013.01); *F16J 9/20* (2013.01); *F16J 9/26* (2013.01)

(58) Field of Classification Search
    CPC ....... C23C 28/343; C23C 4/129; C23C 4/131; C23C 4/134; C23C 4/08; C23C 4/10; C23C 4/18
    See application file for complete search history.

(56) References Cited

U.S. PATENT DOCUMENTS

2010/0127462 A1    5/2010  Buchmann et al.
2011/0101621 A1*  5/2011  Kennedy .................. C23C 4/06
                                                  277/444
2012/0306158 A1*  12/2012  Kennedy ............... C23C 28/023
                                                  277/442

FOREIGN PATENT DOCUMENTS

| | | | | |
|---|---|---|---|---|
| DE | 19851424 A1 | * | 5/2000 | ................ F16J 9/26 |
| DE | 19931829 A1 | | 1/2001 | |
| DE | 10212299 A1 | | 10/2003 | |
| DE | 102007025949 A1 | | 12/2008 | |
| DE | 202009009206 U1 | | 9/2009 | |
| RO | 127964 | * | 11/2012 | |
| WO | 2008083793 A1 | | 7/2008 | |
| WO | WO-2012010376 A1 | * | 1/2012 | ............ B22F 1/0059 |

* cited by examiner

US 11,384,436 B2

PISTON RING WITH SHOT-PEENED RUNNING-IN LAYER AND METHOD FOR THE PRODUCTION THEREOF

BACKGROUND

1. Technical Field

The present invention relates to a piston ring and a method for manufacturing same, in particular a large bore piston ring having a multilayer coating for an internal combustion engine, or a piston ring for 2-stroke applications.

2. Related Art

In piston rings such as those in reciprocating piston internal combustion engines, two contradictory requirements must be met. On the one hand, high wear resistance must be provided, since otherwise, with a piston ring that is becoming thinner, gas leakage and oil consumption may increase and impair the performance of the engine. On the other hand, as the result of an abrasive piston ring, the gap between the cylinder wall and the piston ring becomes increasingly greater, so that combustion gases can more easily escape past the ring (so-called blow-by), which reduces the efficiency of the engine. Due to an enlarged gap, the unscraped oil film remaining in the combustion chamber becomes thicker, so that more oil per unit time may be lost; i.e., the oil consumption is increased.

To achieve maximum optimization of the engine characteristics, i.e., to attain the best possible compromise between a maximum sealing effect and low friction losses, the dimensions of the gap between the piston ring(s) and the cylinder wall must therefore be maintained as precisely as possible. However, this would require complicated, costly process steps during manufacture and assembly of the engine, since otherwise, a certain degree of unavoidable tolerances would continually result. A possible minor to small gap dimension is therefore usually accepted, and the piston ring is allowed to reach the optimal thickness via abrasion during operation. Ideally, the running surface of the piston ring is abraded until the optimal gap diameter is achieved. This process is also referred to as "run-in."

Thus, on the one hand a preferably wear-resistant material is desired in order for the piston ring to experience as little wear as possible during normal operation, and the gap to undergo only minor enlargement. On the other hand, to achieve good run-in properties it must be possible for at least a portion of the running surface to undergo relatively less abrasion, so that an excessively small gap (due to unavoidable component tolerances, for example) between the piston ring and the cylinder wall may be increased as quickly as possible to the correct dimension during the run-in operation.

Therefore, in principle piston rings are provided with coatings that are designed to bring about the desired properties. This is naturally easier to manage and less costly than to manufacture the entire piston ring using a possibly expensive material having the desired properties. There is a further requirement for such coatings. In addition to providing the necessary properties, the coating must also be designed so that it does not peel from the piston ring, i.e., has good adhesion with the underlying material. If the coating is composed of several different layers, good cohesion between the layers is also necessary. Otherwise, there is a risk of crack formation or peeling of the layers, which may be detrimental to the engine.

Coatings on the running surfaces of piston rings must be wear-resistant in the surface region in contact with the cylinder wall. In addition, their intrinsic wear in the run-in phase should be sufficient for a satisfactory adaptation to the countersurface. Furthermore, these layers should have high fracture resistance, and exhibit little or no fatigue behavior, even after long run times.

Wear-resistant layers are manufactured from hard chromium, for example. DE 199 31 829 A1 describes an electroplated hard chromium layer for a piston ring. Other materials for wear-resistant layers are chromium with aluminum oxide ceramic (for example, CKS® from Federal-Mogul) or chromium with microdiamond (for example, GDC® from Federal-Mogul).

Run-in layers that are applied to CKS® wear-resistant layers are based on molybdenum, for example, which is applied to the wear-resistant layer by wire flame spraying. The wear-resistant layer is activated beforehand by means of a blasting process.

Furthermore, a run-in layer made of an AlCuFe alloy may be applied to a CKS® wear-resistant layer by thermal spraying. However, for this purpose it is necessary to first apply an electroplated intermediate layer to the CKS® wear-resistant layer.

However, the run-in and wear properties of known piston rings having a chromium-based wear-resistant layer and a run-in layer applied thereto are in need of further improvement.

SUMMARY

The object of the present invention is to provide a piston ring having improved run-in and wear behavior, and a method for manufacturing same.

According to a first embodiment of the invention, a piston ring is provided that comprises:
  an annular body;
  a wear-resistant layer that is applied to the annular body by thermal spraying; and
  a strain-hardened run-in layer, made of an AlCuFe alloy, that is applied to the wear-resistant layer by thermal spraying.

By use of the two different functional layers, the piston ring according to the invention provides a novel, advantageous combination of wear resistance (due to the wear-resistant layer) and favorable run-in properties (due to the run-in layer). The run-in layer is suitably post-processed by shot peening, for example, and is thereby strain-hardened and compacted. The wear-resistant layer prevents excessive wear under extreme operating conditions of the engine.

Alternatively, the piston ring is characterized by:
  an annular body;
  a wear-resistant layer that is applied to the annular body by thermal spraying; and
  a run-in layer, made of an AlCuFe alloy, that is applied to the wear-resistant layer by thermal spraying, wherein the run-in layer has a roughness Rz of <100 µm, preferably 60-95 µm, particularly preferably 70-95 µm.

In a further alternative, the piston ring is characterized by:
  an annular body;
  a wear-resistant layer that is applied to the annular body by thermal spraying; and
  a run-in layer, made of an AlCuFe alloy, having a hardness HV of 150-250, preferably 170-210, particularly preferably 180-200, that is applied to the wear-resistant layer by thermal spraying.

In one embodiment of the piston ring, the run-in layer is applied to the wear-resistant layer by electric arc wire spraying. Electric arc wire spraying is a simple, cost-effective way to apply a coating to a base surface. This method is particularly suited for producing relatively soft coatings, which may be used for run-in layers. Electric arc wire spraying may also be used to easily produce a wear-resistant AlCuFe layer.

In another embodiment of the piston ring, the AlCuFe run-in layer is strain-hardened by shot peening, rolling, or hammering. Strain hardening introduces compressive stresses into the layer, resulting in hardening of the run-in layer. Thus far, run-in layers have not been post-processed, since their task is to be removed during a run-in phase. Ostensibly, there did not appear to be a need to pay more attention to a layer that is almost completely removed within a short operating period, for which reason further machining steps have been dispensed with in the past. As a result of strain hardening, a run-in layer may become more stable and therefore last longer, so that the run-in process of a reciprocating engine may be extended. In addition, it is common to use a different material or to change the thickness of the run-in layer in order to adjust the run-in period to a desired value. The stability of the run-in layer is increased by strain hardening in order to extend the run-in period with the same material expenditure, or to reduce the thickness of the material with the same run-in period. The run-in layer has only a small thickness, and the strain hardening may achieve hardening over essentially the entire thickness of the run-in layer.

In another embodiment of the piston ring, a surface of the run-in layer after the shot peening has a coverage of 50-100%, preferably 70-100%, more preferably 90-100%. At least 50% of the surface of the run-in layer is affected by indentations from the shot pellets due to the shot peening process. The indentations from the shot pellets on the surface of the run-in layer cover at least 50%, preferably at least 70%, more preferably at least 90%, of the surface of the run-in layer. Under a microscope, the surface structure of the run-in layer shows the imprints from the shot pellets resulting from the shot peening. Via the surface structure with the imprints from the shot pellets, it may be easily determined whether or not the run-in layer has been strain-hardened by shot peening.

An adhesion promoter layer is preferably provided between the annular body and the wear-resistant layer. The adhesion promoter layer ensures optimal adhesion of the layers on the annular body.

The wear-resistant layer, the run-in layer, and optionally the adhesion promoter layer are preferably applied in over-sprayed form.

The annular body preferably has gas discharge slots having a bevel on their edges.

The bevel preferably has an angle of 30° to 70°. In addition, the bevel preferably has a width of 0.5 to 2.0 mm.

According to another aspect of the invention, a method for manufacturing a piston ring according to the first embodiment of the invention is provided, comprising:
  providing an annular body;
  thermally spraying a wear-resistant layer onto the annular body; and
  thermally spraying a run-in layer, made of an AlCuFe alloy, onto the wear-resistant layer, the run-in layer being compacted by shot peening.

The wear-resistant layer, the run-in layer, and optionally the adhesion promoter layer are preferably applied in over-sprayed form.

The thermal spraying preferably encompasses the following coating processes:
  an electric arc wire coating process;
  a flame coating process;
  atmospheric plasma spraying (APS); and
  high-velocity oxygen fuel (HVOF) flame spraying.

In the method, the run-in layer may be applied to the wear-resistant layer by electric arc wire spraying.

The run-in layer may be strain-hardened by shot peening, rolling, and/or hammering.

The shot peening should be carried out in such a way that a coverage of 50-100%, preferably 70-100%, more preferably 90-100%, is achieved.

The method preferably further comprises:
  providing the flank of the annular body with a bevel at its edges prior to spraying on the adhesion promoter layer.

If the annular body has gas discharge slots, the method preferably further comprises:
  providing the gas discharge slots with a bevel at their edges prior to spraying on the adhesion promoter layer.

The bevel preferably has an angle of 30° to 70°. In addition, the bevel preferably has a width of 0.5 to 2.0 mm.

THE DRAWINGS

The present invention is explained below with reference to figures of schematic illustrations of exemplary embodiments.

DETAILED DESCRIPTION

Identical or similar reference symbols are used in the description and in the figures to refer to identical or similar elements and components.

Coatings on the running surfaces of piston rings, in addition to having good, temperature-resistant adhesion to the substrate and good, temperature-resistant binding within the layer (cohesion), must also be wear-resistant in the surface region that is in contact with the cylinder wall. In addition, their intrinsic wear in the run-in phase should be sufficient for a satisfactory adaptation to the countersurface. Furthermore, these layers should have high fracture resistance, and exhibit little or no fatigue behavior, even after long run times.

In the present case, a strain-hardened run-in layer made of an AlCuFe alloy is used which is produced by electric arc wire spraying onto a piston ring. The strain hardening here is achieved by shot peening, resulting in smoothing and hardening of the run-in layer. The shot peening, i.e., the strain hardening, results in compaction of the sprayed-on run-in layer. The strain hardening produces compressive stresses in the run-in layer that result in an improved, stronger run-in layer. The strain hardening may affect practically the entire thickness of the run-in layer. The shot peening is to be carried out using steel shot blast pellets having a diameter of 0.5 to 1 mm so that a sufficiently smooth, hardened surface of the run-in layer may be achieved. The blasting pressure may be between 2.5 bar and 6 bar, preferably between 3 bar and 5.5 bar, more preferably between 4 bar and 5 bar. Shot peening may be carried out here at a distance between 50 and 200 mm from the surface of the run-in layer. It is possible to use a mass throughput of 1 to 3 kg blast pellets per minute in the shot peening. Rolling, knurling, or hammering may also be used as strain hardening processes instead of shot peening.

The object of the present invention, therefore, is to provide the running surfaces of piston rings with wear-resistant layers, applied by a flame spraying process, that are able to withstand extreme stresses but which exhibit good run-in behavior. The method for producing the layers is intended to be preferably simple and cost-effective, and in particular to allow production of the wear-resistant coatings and also the run-in layer with properties that are coordinated with the particular application.

According to the invention, in a first embodiment this object is achieved by a coating made up of at least two different spray layers situated one on top of the other: a wear-resistant layer, optionally an adhesion promoter layer, and an outer run-in layer. The adhesion and cohesion of the layers may be further improved by appropriately beveling edges at the ring flank and the use of gas discharge slots prior to the coating.

Figure 1A:
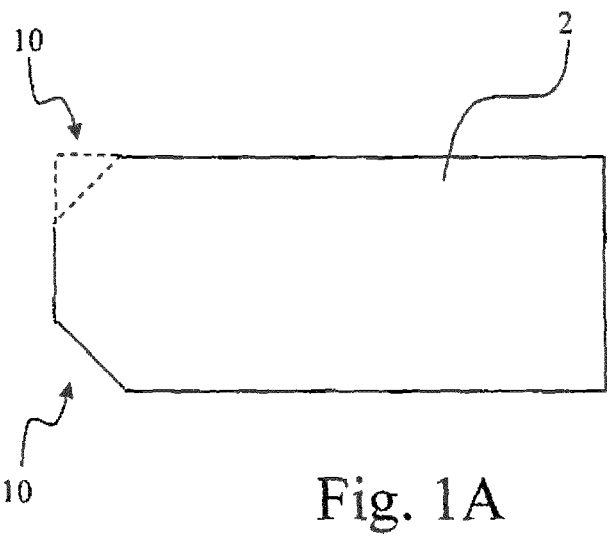
FIGS. 1A through 1F show one embodiment of the method based on a sectional view of a piston ring during various machining steps.
Figure 1B:
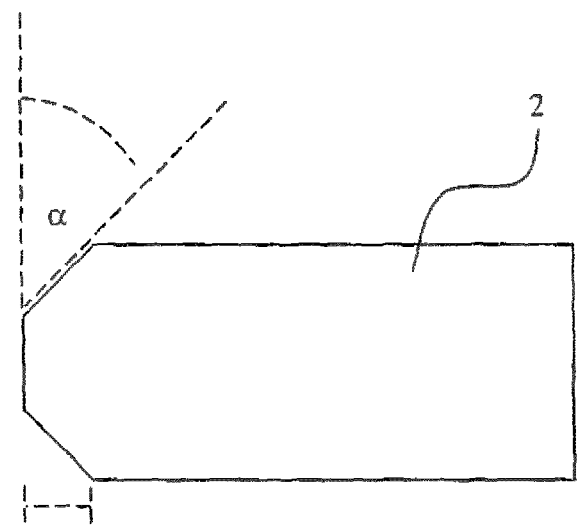
Figure 2:
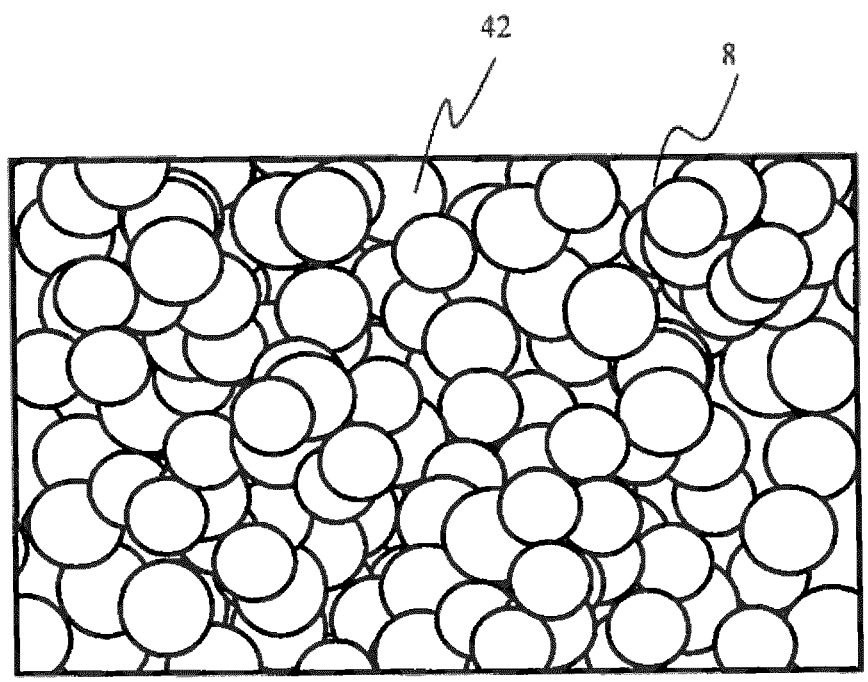
FIG. 2 shows a top view of a strain-hardened run-in layer at the running surface of one embodiment of a piston ring according to the invention.

FIGS. 1A and 1B show a cross-sectional view of how the piston ring or the annular body 2 is beveled. According to the invention, prior to the coating, the edges of the piston ring 2 may be provided with a bevel 10 on the running surface side (at the left in the figure). According to the invention, the angle α of the bevel 10 may be between 30° and 70°; an angle of 45° is shown in FIG. 2 by way of example. In addition, according to various embodiments of the invention the bevel 10 may have a width d of 0.5 to 2 mm. The faceting of edges is an optional step in the manufacture of the piston ring; i.e., the bevel is an optional feature for the finished piston ring according to the invention. The faceting may be carried out using any suitable known method. It is likewise possible to round off the running surface of the piston ring in order to obtain a barrel-shaped running surface. The faceting or shaping of the running surface may be carried out using any suitable known method.

Figure 1C:
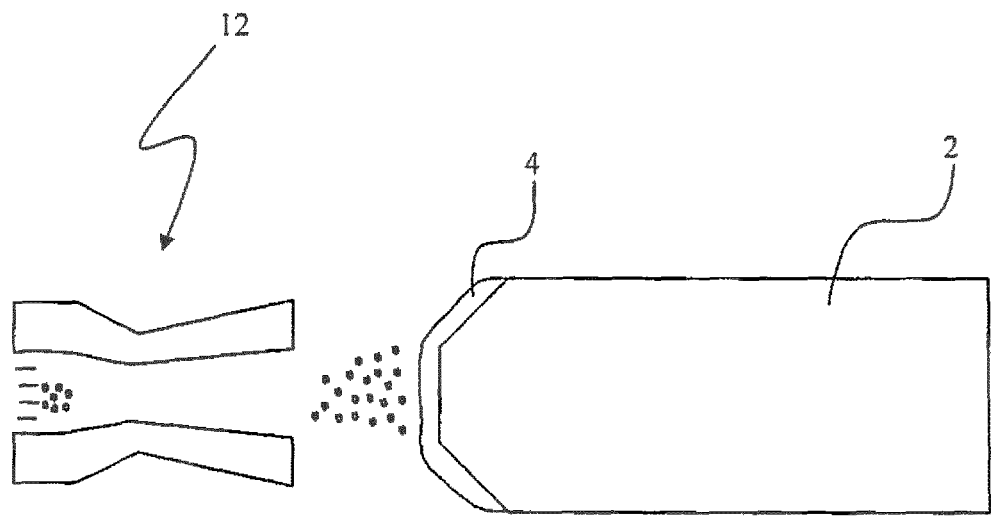

FIG. 1C shows a cross-sectional view of the step of applying the first layer of the coating. An adhesion promoter layer 4 is applied to the annular body 2. According to the invention, this takes place by means of a thermal spraying process, encompassing high-velocity oxygen fuel (HVOF) flame spraying, atmospheric plasma spraying (APS), electric arc wire coating, or wire flame coating processes. As an example, this is illustrated by an HVOF device 12. The adhesion promoter layer 4 is designed here as a nickel alloy.

Figure 1D:
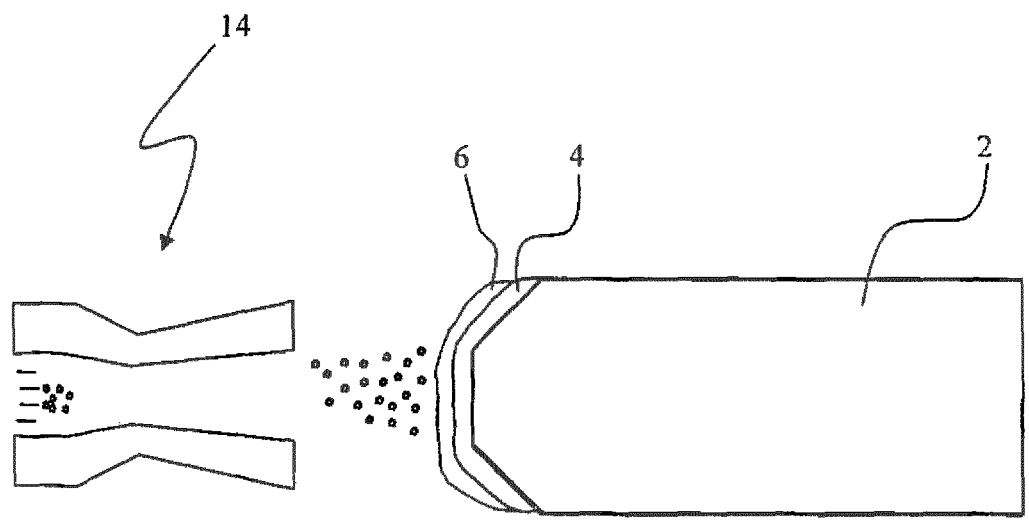

In FIG. 1D, a wear-resistant layer 6 is then applied to or over the adhesion promoter layer 4. This may take place, the same as the application of the adhesion promoter layer, using one of the above-mentioned thermal spraying process, it also being possible to use different processes for different respective layers. In the example shown, this is likewise achieved using an HVOF device 14. The layer design is FF, i.e., oversprayed.

According to the first embodiment of the invention, the wear-resistant layer may be a molybdenum alloy with chromium carbide CrC or tungsten carbide WC or molybdenum carbide MoC.

Figure 1E:
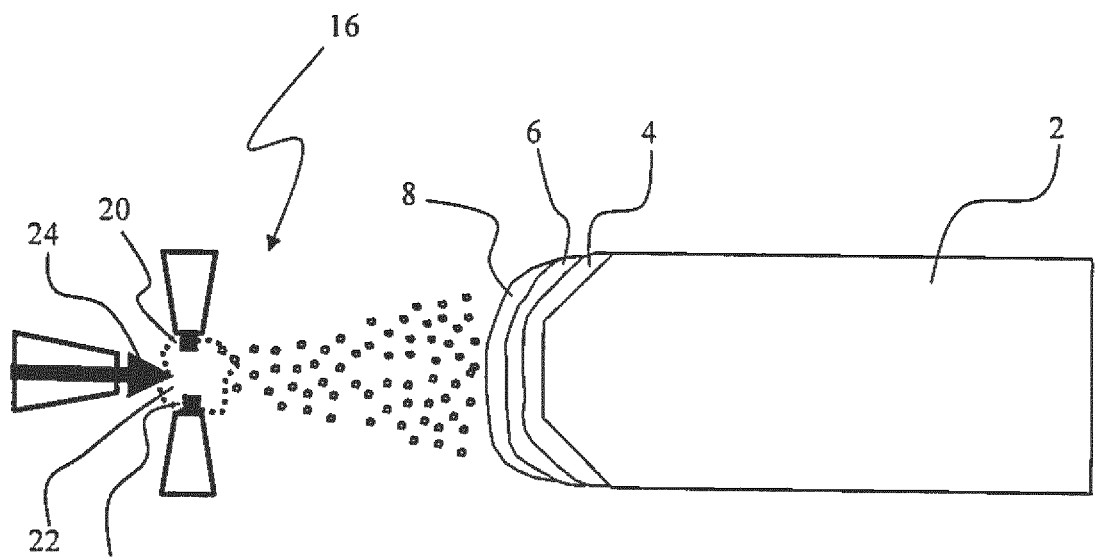

In FIG. 1E, a run-in layer 8 is then applied to or over the one wear-resistant layer 6. This is carried out by electric arc wire spraying, using an electric arc wire spraying device 16. The layer design here is likewise FF, i.e., oversprayed. The run-in layer includes aluminum-copper-iron (an AlCuFe alloy). The piston ring is preferably a large bore piston ring for a 2-stroke internal combustion engine.

Figure 1F:
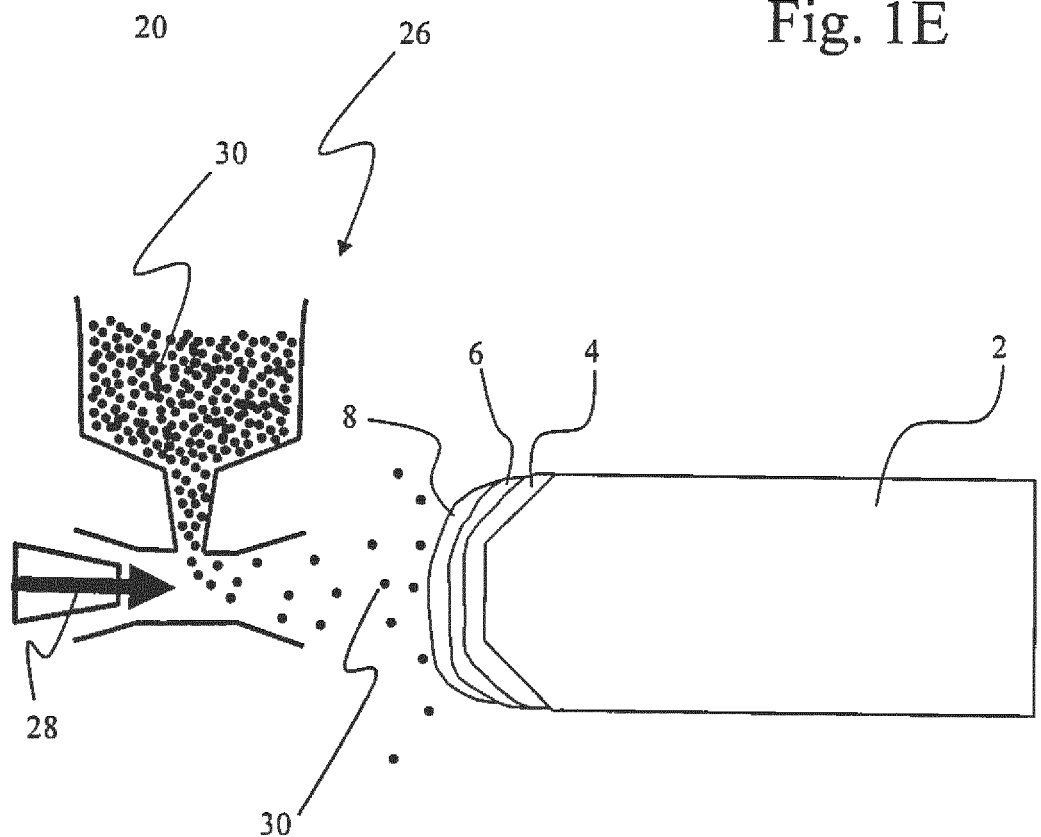

In FIG. 1F, the last applied run-in layer is post-processed on its surface or running surface by shot peening. The run-in layer is strain-hardened at the running surface, as the result of which the run-in phase of the engine is extended, or the abrasion may be reduced by using a thinner run-in layer. The shot peening device 26 is used for the strain hardening.

In FIG. 1F, the finished piston ring is illustrated in a cross-sectional view according to the first embodiment of the invention, comprising the annular body 2, the adhesion promoter layer 4, the wear-resistant layer 6, and the run-in layer 8.

According to a second embodiment of the present invention, a piston ring comprises an annular body, a wear-resistant layer that is applied to the running surface of the annular body, and a strain-hardened AlCuFe alloy run-in layer that is applied to the wear-resistant layer. The AlCuFe alloy may be composed of these components and unavoidable impurities, or the AlCuFe alloy may include further alloying elements and solid lubricants such as carbon in small amounts.

FIG. 2 illustrates an enlarged detail of the running surface of the piston ring according to the invention, the surface showing the imprints from the shot blast pellets 42 on the running surface or the run-in layer 8. The imprints 42 here show a large coverage, as the result of which the entire surface of the run-in layer 8 is strain-hardened.

By use of the two different functional layers, the piston ring according to the invention provides a novel, advantageous combination of wear resistance (due to the wear-resistant layer) and favorable run-in properties (due to the AlCuFe run-in layer). The run-in layer 8 is strain-hardened after the spraying, and is removed by the abrasion that occurs in the run-in phase. The wear-resistant layer 6 prevents excessive wear under extreme operating conditions of the engine.

The wear-resistant layer 6 preferably includes hard chromium, chromium with aluminum oxide ceramic (for example, CKS® from Federal-Mogul), or chromium with microdiamond (for example, GDC® from Federal-Mogul). The wear-resistant layer 6 may likewise be provided with a diamond-like carbon (DLC) layer or may include such a layer.

The run-in layer 8 preferably has a layer thickness of 20 to 400 μm.

The application of the wear-resistant layer preferably takes place using a thermal spraying process. The thermal spraying process is preferably atmospheric plasma spraying (APS, for example MKP) or high-velocity oxygen fuel (HVOF) flame spraying (for example, MKJet® from Federal-Mogul). The wear-resistant layer preferably includes hard chromium, chromium with aluminum oxide ceramic (for example, CKS® from Federal-Mogul), or chromium with microdiamond or a diamond-like carbon layer (for example, GDC® from Federal-Mogul).

The wear-resistant layer is preferably activated by a blasting process or is activated thermally.

The application of the run-in layer 8 takes place using a thermal coating process. The thermal coating process is preferably electric arc wire spraying.

The run-in layer 8 preferably has a layer thickness of 20 to 400 μm.

The invention claimed is:
1. A piston ring, comprising:
an annular body;
a thermally sprayed wear-resistant layer on the annular body; and a thermally sprayed run-in layer, made of an AlCuFe alloy, on the wear-resistant layer, wherein the run-in layer has imprints from shot peening, at which the run-in layer has a greater hardness due to strain hardening, wherein the run-in layer has a hardness HV of 150-250, wherein a coverage of 50-100% is achieved in the shot peening, and wherein the run-in layer has a roughness Rz between 60 μm and 95 μm.

2. The piston ring according to claim 1, wherein the run-in layer is applied to the wear-resistant layer by electric arc wire spraying.

3. The piston ring according to claim 1, further including a thermally sprayed adhesion promoter layer on the running surface of the annular body, wherein the wear-resistant layer is applied to the adhesion promoter layer.

4. The piston ring according to claim 1, wherein the wear-resistant layer and the run-in layer are applied in oversprayed form.

5. The piston ring according to claim 1, wherein the annular body has a flank with beveled edges.

6. The piston ring according to claim 5, wherein the beveled edges have an angle of 30 to 70°.

7. The piston ring according to claim 5, wherein the beveled edges have a width of 0.5 mm to 2.0 mm.

8. The piston ring according to claim 1 wherein the annular body has gas discharge slots with beveled edges.

9. The piston ring according to claim 8, wherein the beveled edges of the gas discharge slots have an angle of 30° to 70°.

10. The piston ring according to claim 8, wherein the beveled edges of the gas discharge slots have a width of 0.5 to 2.0 mm.

11. The piston ring according to claim 1, wherein the piston ring is a large bore piston ring.

12. A method for manufacturing a piston ring, comprising:
providing an annular body;
thermal spraying of a wear-resistant layer on the annular body; and
thermal spraying of a run-in layer, made of an AlCuFe alloy, on the wear-resistant layer, and
strain hardening the run-in layer by shot peening, wherein a coverage of 50-100% is achieved in the shot peening,
wherein the run-in layer has a hardness HV of 150-250, and
wherein the run-in layer has a roughness Rz between 60 μm and 95 μm.

13. The method according to claim 12, wherein the run-n layer is applied to the wear-resistant layer by electric arc wire spraying.

14. The method according to claim 12, wherein the thermal spraying of the wear-resistant layer encompasses one of:
an electric arc wire coating process;
a wire flame coating process;
atmospheric plasma spraying (APS); and
high-velocity oxygen fuel (HVOF) flame spraying.

15. The method according to claim 12, further comprising:
providing the flank of the annular body with a bevel at its edges, wherein the bevel preferably has an angle of 30° to 70° and/or a width of 0.5 to 2.0 mm, and/or
providing the gas discharge slots with a bevel at their edges, wherein the bevel preferably has an angle of 30° to 70° and/or a width of 0.5 to 2.0 mm.

* * * * *